United States Patent
McCulfor et al.

[11] Patent Number: 5,352,430
[45] Date of Patent: Oct. 4, 1994

[54] METHOD OF MANUFACTURING INTERCALATION COMPOUNDS

[75] Inventors: Timothy J. McCulfor, Hebron, Ind.; F. Lincoln Vogel, Whitehouse Station, N.J.

[73] Assignee: Inland Steel Company, Chicago, Ill.

[21] Appl. No.: 914,513

[22] Filed: Jul. 17, 1992

[51] Int. Cl.$^5$ .............................................. C01B 31/04
[52] U.S. Cl. .................... 423/448; 423/460; 423/290; 423/561.1
[58] Field of Search ............ 423/448, 460, 290, 561.1, 423/266, 275, 265; 252/30

[56] References Cited

U.S. PATENT DOCUMENTS

| | | | |
|---|---|---|---|
| 3,377,280 | 4/1968 | Knappwost | 252/30 |
| 4,160,813 | 7/1979 | Markel et al. | 423/448 |
| 4,560,409 | 12/1985 | Goldberg et al. | 423/448 |
| 4,604,276 | 8/1986 | Oblas et al. | 423/449 |
| 4,608,192 | 8/1986 | Su | 252/506 |
| 4,729,884 | 3/1988 | Sugiura et al. | 423/448 |

FOREIGN PATENT DOCUMENTS

| | | | |
|---|---|---|---|
| 60-118618 | 6/1985 | Japan | 423/448 |
| 63-295412 | 12/1988 | Japan | 423/448 |

OTHER PUBLICATIONS

E. Stumpp, "The Intercalation of Metal Chlorides and Bromides into Graphite", *Materials Science and Engineering*, 31, pp. 53-59 (1977). no month.

S. Flandrois, et al., "Intercalation Compounds of Graphite with Nickel Chloride, Synthesis, Structure, and Mechanism of Intercalation", *Synthetic Metals*, 3, pp. 1-13 (1981).

M. Dresselhaus, "Modifying Materials by Intercalation", *Physics Today*, pp. 2-10 (Mar. 1984).

H. P. Boehm, et al., "Nomenclature and Terminology of Graphite Intercalation Compounds", *Synthetic Metals*, 11, pp. 363-371 (1985). no month.

*Primary Examiner*—Gary P. Straub
*Assistant Examiner*—Stuart L. Hendrickson
*Attorney, Agent, or Firm*—Marshall, O'Toole, Gerstein, Murray & Borun

[57] ABSTRACT

A method of manufacturing an intercalation compound, such as a graphite intercalation compound, in a fluidized bed reactor. The intercalation compound comprises a host material, like graphite, and an intercalant and is essentially free of excess intercalant.

12 Claims, 2 Drawing Sheets

METHOD OF MANUFACTURING INTERCALATION COMPOUNDS

FIELD OF THE INVENTION

The present invention is directed generally to a method of manufacturing an intercalation compound, and more particularly to a method of manufacturing a graphite intercalation compound utilizing a fluidized bed reactor, wherein the intercalation compound comprises a host material, like graphite, and an intercalant, and is essentially free of excess intercalant.

BACKGROUND OF THE INVENTION

Graphite is a crystalline form of carbon. The carbon atoms in graphite form a layered structure wherein each carbon atom is strongly bonded to three other carbon atoms in the same layer by covalent bonds called sigma bonds, and is relatively weakly bonded to carbon atoms in adjacent layers by delocalized bonds called pi bonds. Accordingly, the layers of carbon atoms in graphite are weakly bonded to each other by a delocalized distribution of pi electrons, which may account for the lubricating and electrical conducting properties of graphite.

Because of the weak bonding between carbon layers in graphite, a variety of compounds that either accept or donate electrons can be interspaced between adjacent carbon layers in graphite to expand the graphite lattice. The compound interspaced between the carbon layers of graphite is termed, here and hereinafter, an "intercalant". During an interaction with graphite, the intercalant diffuses between adjacent carbon layers in graphite, and an electron exchange occurs between the intercalant and the carbon atoms of the graphite. Compounds resulting from the interaction between graphite and an intercalant are termed, here and hereinafter, "graphite intercalation compounds".

Depending upon the relative amounts of graphite and the particular intercalant that are interacted, different graphite intercalation compounds result. These different compounds are termed "stages" of a particular graphite intercalation compound. For example, a first stage graphite intercalation compound has alternate layers of carbon and the intercalant; a second stage graphite intercalation compound has two successive carbon layers of graphite followed by a layer of intercalant; a third stage graphite intercalation compound has three successive carbon layers of graphite followed by a layer of intercalant; and so on.

Nonintercalated graphite is known and used as a lubricant and as an electrical conductor. An intercalant improves the mechanical properties of graphite, and especially the self-lubricating properties of graphite. However, conventional methods of manufacturing graphite intercalation compounds have the following disadvantages: 1) production of a nonuniform product that includes excess, i.e., non-intercalated, intercalant, and 2) low production volumes. A need exists to overcome these disadvantages.

One conventional method of manufacturing a graphite intercalation compound utilizes a static bed reactor. In this method, the graphite and the intercalant, such as a metal halide, first are admixed, then the mixture is introduced into a resealable static, i.e., fixed, bed reactor. After sealing the reactor, the mixture is heated. However, a simple mixture of graphite and an intercalant, in the absence of an interactive gas, does not interact, even at an elevated temperature, to form a graphite intercalation compound. An interactive gas, such as chlorine gas ($Cl_2$), therefore is passed through the heated mixture of graphite and intercalant to form the graphite intercalation compound. The interactive gas can be generated in situ or can be passed through the graphite-intercalant mixture as a gas stream. In general, the interactive gas mediates electron transfers that allow the intercalant to become interspaced between the adjacent carbon layers of graphite.

A conventional fixed bed reactor includes an inlet for the interactive gas stream and an outlet for interactive gas stream and other interaction byproducts. Therefore, a stream of an interactive gas is introduced to the fixed bed reactor and allowed to pass through the heated graphite-intercalant mixture to provide a graphite intercalation compound.

The above-described conventional method of manufacturing a graphite intercalation compound yields only about 3.5 pounds of graphite intercalation compound per 8 hours. Design limitations for static bed reactors essentially preclude the assembly of large scale reactors, thereby limiting the static bed reactors to pilot plant scales and, accordingly, low volume yields.

Furthermore, a graphite intercalation compound resulting from the conventional static bed method is a nonuniform product because: 1) packing of the graphite-intercalant mixture in the fixed bed reactor prevents the stream of interactive gas from passing through the graphite-intercalant mixture uniformly across the crosssection of the fixed bed reactor; and 2) a heat gradient exists over the crosssection of the fixed bed, wherein the center of the fixed bed is cooler than regions of the fixed bed closer to the walls of the reactor. The packing of the mixture also results in channeling of the interactive gas through the fixed bed of graphite-intercalant mixture. Accordingly, there is non-uniform contact between the interactive gas and the graphite-intercalant mixture, further resulting in a non-homogeneous product.

After the interaction between the graphite and the intercalant is complete, the fixed bed reactor is cooled, then the top of the reactor is unsealed, and the graphite intercalation compound is removed from the bed of the reactor. The resulting graphite intercalation compound includes excess, i.e., non-intercalated, intercalant, and includes free, i.e., non-interacted, graphite. Usually therefore, a graphite intercalation compound prepared by a present-day commercial fixed bed method includes up to about 40% by weight excess intercalant, providing a nonuniform graphite intercalation compound that has decreased self-lubricating properties compared to a graphite intercalation compound that is essentially free of excess intercalant. In contrast, the present method provides a graphite intercalation compound that is essentially free of excess intercalant. In addition, the present invention allows the purification of a graphite intercalation that includes a large amount of excess intercalant, such as a graphite intercalation compound prepared in a fixed bed reactor, to provide a graphite-intercalation compound including 1% or less by weight excess intercalant.

Another method of manufacturing a graphite intercalation compound is disclosed in Knappwost, U.S. Pat. No. 3,377,280, wherein graphite and a metal powder are heated in the presence of a halogenating agent, like chlorine gas, to provide a graphite-metal halide intercalation compound. The Knappwost method purportedly overcomes the difficult and commercially unattractive expense of heating graphite and a metal halide to form a graphite intercalation compound.

Oblas et al., in U.S. Pat. No. 4,604,276, and Su, in U.S. Pat. No. 4,608,192, disclose the preparation of a graphite intercalation compound in a vapor-transport reactor. The method of Oblas et al. utilizes metal halide vapors generated in a first zone of a reactor to intercalate graphite in a second zone of the reactor. The resulting graphite intercalation compound is maintained at a temperature sufficiently high to prevent condensation of the metal halide on the graphite intercalation compound, and thereby a more pure and uniform product is provided. Su discloses a similar method.

Sugiura et al. U.S. Pat. No. 4,729,884 discloses the preparation of a graphite metal chloride intercalation compound without the use of chlorine gas. The method of Sugiura et al. utilizes both (1) a first metal chloride to intercalate the graphite, and (2) a relatively small amount of a second metal chloride, having a lower boiling point than the first metal chloride, as a substitute for the chlorine gas. Although the method of Sugiura et al. increases the reaction rate for producing a graphite intercalation compound, the intercalation compound can also include some second metal halide intercalated into the graphite, which is undesirable because the presence of two metal halides can adversely affect the properties of the desired graphite intercalation compound.

It would be desirable to provide a simple and economical method of manufacturing a graphite intercalation compound in high volume, and in a relatively short reaction time. It would also be desirable to provide a graphite intercalation compound which is uniform and is essentially free of excess intercalant, and to provide a method of purifying a graphite intercalation compound by removing excess intercalant.

SUMMARY OF THE INVENTION

The present invention provides a simple and economical method of manufacturing a pure and uniform graphite intercalation compound in high volume. The method of the present invention provides a graphite intercalation compound that is uniform in composition and essentially free of excess intercalant. In particular, the method utilizes a fluidized bed reactor to provide a uniform and essentially pure graphite intercalation compound. The present invention also provides a simple method of purifying a graphite intercalation compound.

More particularly, graphite and an intercalant first are introduced into a fluidized bed reactor. It is not necessary to premix the graphite and the intercalant. A stream of inert gas then is introduced into the fluidized bed reactor. The inert gas first passes through a gas distribution system, to evenly distribute the stream of inert gas across the cross-section of the fluidized bed reactor, and then passes through the bed of graphite and intercalant. The stream of inert gas fluidizes the bed of graphite and intercalant to mix the graphite and intercalant and provide a homogeneous fluidized graphite-intercalant mixture.

The fluidized graphite-intercalant mixture then is heated to a sufficient temperature, and maintained at that temperature for a sufficient time, to allow the stream of inert gas to purge the fluidized bed of moisture and other low boiling compounds that can interfere in the intercalation interaction. The fluidized, graphite-intercalant mixture then is further heated to a temperature wherein the graphite can interact with the intercalant.

The stream of inert gas then is replaced by a stream of an interactive gas that allows an interaction between the graphite and the intercalant to proceed at the interaction temperature. The fluidized bed of graphite and intercalant, in the presence of a stream of interactive gas, is maintained at the interaction temperature for a sufficient time to provide a graphite intercalation compound. The temperature of the graphite intercalation compound in the fluidized bed reactor then is raised to a sufficient temperature to purge the fluidized bed reactor of excess intercalant, and therefore provide a graphite intercalation compound that is essentially free of excess intercalant. Next, the fluidized bed reactor is cooled and purged of the interactive gas by replacing the stream of interactive gas with a stream of inert gas.

The resulting graphite intercalation compound is uniform in composition and is essentially free of excess intercalant. The inventive method provides a graphite intercalation compound having a uniform composition because the method overcomes the following problems: 1) inert gas and interactive gas channeling; 2) poor contact between the interactive gas, the graphite and the intercalant; 3) packing of interactants in the reactor; and 4) a temperature gradient across the cross-section of the reactor; whereas each of those problems existed in the conventional method of manufacturing a graphite intercalant compound in a fixed bed reactor. In addition, the inventive method increases the amount of graphite intercalation compound manufactured per hour over the conventional, fixed bed reactor manufacturing method by a factor of about 20 in a batch process to about 60 in a continuous process.

The inventive method can be utilized in the manufacture (1) of essentially any graphite intercalation compound and, (2) by adjusting the relative proportions of the graphite and intercalant, of any stage of a graphite intercalation compound. The method is especially useful in the preparation of a graphite intercalation compound wherein the intercalant is a metal halide and the interactive gas is a halogen gas.

In an alternate method, a graphite intercalation compound is manufactured in a continuous process. In general, an apparatus useful in the continuous method of manufacturing a graphite intercalation compound includes: 1) a zone to mix the graphite and intercalant, 2) an interaction zone wherein the graphite and intercalant interact to form a graphite intercalation compound, 3) a collection zone to collect the graphite intercalation compound, and 4) a pair of buffer zones that separate: a) the mixing zone from the interaction zone and b) the interaction zone from the collection zone.

Another important aspect of the present invention is to provide a method of purifying a graphite intercalation that includes excess intercalant by heating the graphite intercalation compound and passing a gas stream through the heated graphite intercalation to separate the excess intercalant from the graphite intercalation compound. Essentially any graphite intercalation compound, manufactured by any method, can be purified by the present method to provide a graphite intercalation compound having 1% or less by weight excess intercalant.

BRIEF DESCRIPTION OF THE FIGURES

The above and other aspects and advantages of the present invention will become apparent from the following detailed description of the present invention taken in conjunction with the drawing, wherein.

DETAILED DESCRIPTION OF THE PREFERRED EMBODIMENTS

Figure 1:
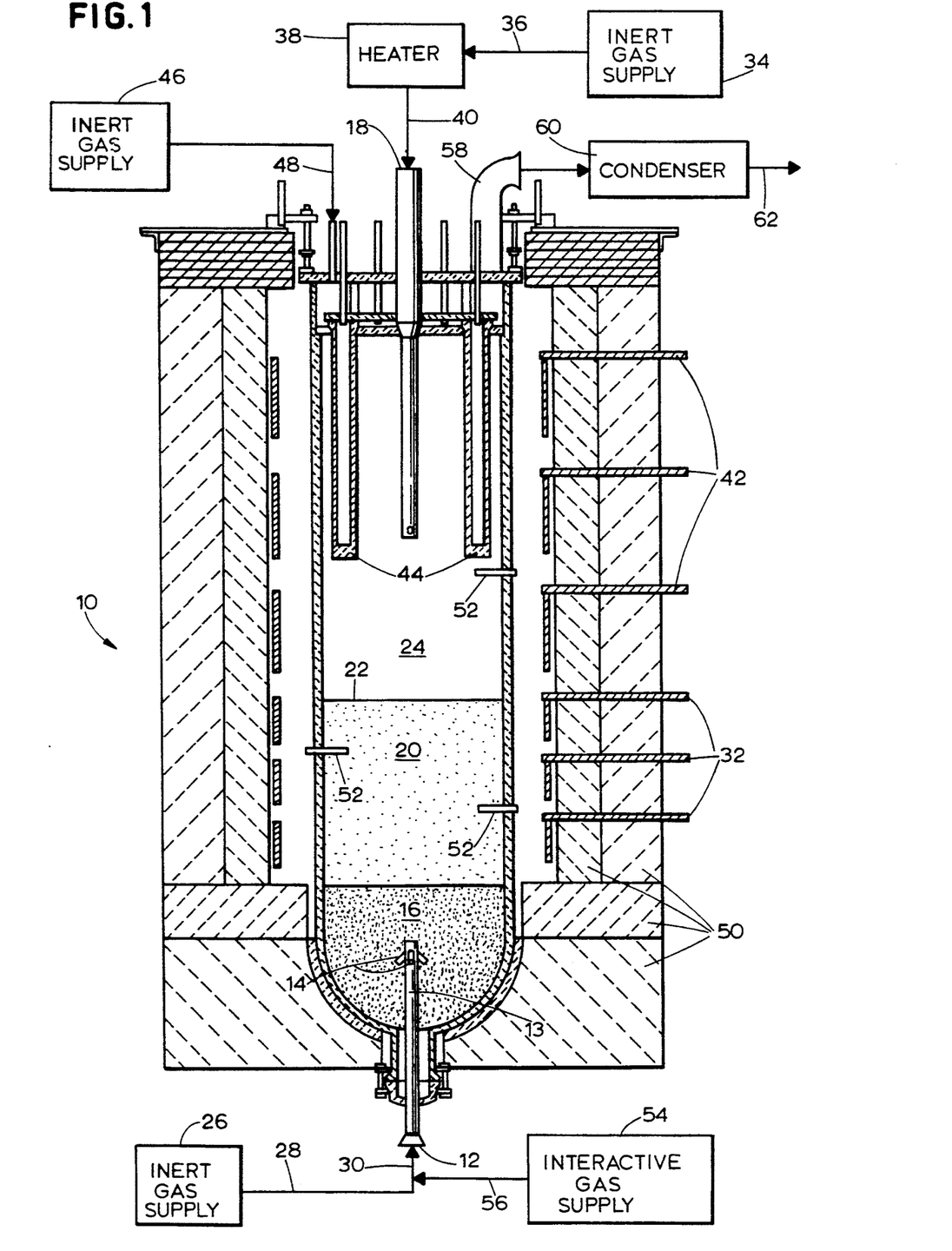
FIG. 1 is a full sectional view of a fluidized bed reactor useful in the method of the present invention.

The method of the present invention is illustrated by reference to the FIG. 1 illustrating the batchwise manufacture of a graphite intercalation compound. In general, the graphite and intercalant are introduced into a vessel 11 of a reactor 10. After sealing reactor 10, an inert gas is passed through vessel 11. The stream of inert gas fluidizes the bed of graphite and intercalant in an interaction zone 20 of vessel 11. The fluidized bed is heated by bed heaters 32. Then an interactive gas, from interactive gas supply 54, is passed through vessel 11 in place of the inert gas.

At the elevated temperature, and in the presence of the interactive gas, the graphite and intercalant interact to form a graphite intercalation compound. The intercalant is maintained in interaction zone 20 by applying a heated inert gas blanket to a free zone 24 of vessel 11. The inert gas blanket prevents the gas phase in free zone 24 from becoming saturated with vapors of the intercalant, thereby precluding condensation of intercalant on filters 44. The inert gas blanket therefore prevents plugging of filters 44. Graphite escaping interaction zone 20 is collected on filters 44, then periodically returned to interaction zone 20 by applying a pulse of an inert gas to filters 44.

After the graphite intercalation compound is formed, excess intercalant is sublimed from vessel 11 and collected in a condenser 60. The vessel 11, and the contents therein, then are cooled and the graphite intercalation compound is removed from reactor 10. The graphite intercalation compound is essentially free of excess intercalant.

The following detailed description particularly sets forth a nonlimiting illustrative example wherein a method of manufacturing a graphite intercalation compound comprising graphite and nickel chloride is described. However, the inventive method also is useful in the manufacture of essentially any graphite intercalation compound comprising: 1) graphite and 2) a metal halide, a metal oxide or a metal sulfide capable of interacting with graphite.

In particular, FIG. 1 is a full sectional view of a fluidized bed reactor 10 including a vessel 11 and a gas inlet 12 to allow a stream of an inert gas and/or a stream of an interactive gas to enter and flow through the vessel 11. The vessel 11 is constructed from materials capable of withstanding both a high process temperature of about 600° C. to about 1000° C. and the corrosive effects of an interactive gas, e.g., chlorine gas. A preferred material of construction for the vessel 11 is fused quartz. Other nonlimiting examples of suitable materials of construction include mullite, alumina and yttria-stabilized zirconia.

The stream of inert and/or interactive gas entering gas inlet 12 is uniformly distributed across the cross-section of vessel 11 by a gas distribution system. Essentially any known gas distribution system can be used to uniformly distribute the inert and/or interactive gas across the cross-section of vessel 11. Examples include the gas diffusion plate disclosed in Staffin et al. U.S. Pat. No. 4,068,389, incorporated herein by reference, or similar gas diffusion plates known to those skilled in the art of designing fluidized bed reactors. Because of the corrosive and reactive nature of the interactive gas, the gas distribution system preferably is constructed from a nonmetallic material, such as, for example, a fritted ceramic plate, a single quartz tuyere, a quartz standpipe containing multiple tuyeres, or a grog, i.e., a bed of solid particles that are nonfluidizable at operating pressures, such as sand or alumina particles. In the figure, the illustrative fluidized bed reactor 10 includes a quartz standpipe 13 with tuyeres 14 and a grog 16 to uniformly distribute the inert gas and interactive gas across the cross-section of the vessel 11.

The graphite and the intercalant are introduced into an interaction zone 20 of vessel 11 through an inlet 18, and these materials fall to the bottom of the interaction zone 20 above grog 16. It is not necessary to admix the graphite and intercalant into a homogeneous mixture prior to introducing the graphite and intercalant into vessel 11. The graphite and intercalant can be introduced into interaction zone 20 of vessel 11 in any order. In general, interaction zone 20 can accommodate an amount of graphite and intercalant such that, after fluidizing the bed of graphite and intercalant in vessel 11, the level of the fluidized bed of graphite and intercalant does not rise above an approximate level denoted by line 22. The zone 24 of vessel 11 that lies above line 22 is termed a free zone. The interaction between the graphite and intercalant occurs essentially entirely in interaction zone 20.

Essentially any graphite intercalation compound can be manufactured by the present method, as long as a suitable interactive gas is utilized in conjunction with a particular intercalant. Furthermore, any of the various forms of graphite known to provide a graphite intercalation compound can be used in the present method. Examples of suitable graphite forms include, but are not limited to, powdery natural graphite, sheetlike natural graphite, sheetlike swelled graphite, graphite fibers and synthetic graphite. In the illustrative example provided herein, about 54.3 pounds of SUPERIOR GRAPHITE No. 5035, a synthetic graphite, available commercially from Superior Graphite Co., Chicago, Ill., was introduced into the interaction zone 20 of vessel 11 through inlet 18.

In addition to graphite, other host materials having a lamellar crystal structure and capable of being intercalated can be used in the method of the present invention. Examples of such host materials, include, but are not limited to graphite, molybdenum disulfide and hexagonal boron nitride.

Similarly, any of the various classes of intercalants known to provide a graphite intercalation compound can be used in the method. Examples of suitable classes of intercalants include, but are not limited to, metal halides, metal oxides and metal sulfides. A particularly useful class of intercalants is the metal halides.

A useful metal halide comprises: a) a metal from Group Ia, Group Ib, Group IIb, Group IIIa, Group IVb, Group Va, Group Vb, Group VIb, Group VIIb, and Group VIII of the Periodic Table, a rare earth metal, and combinations thereof; and b) a halide selected from the group consisting of chloride, bromide, fluoride, iodide, and combinations thereof. Examples of specific metal halides include but are not limited to, the chlorides and bromides of iron, cobalt, copper, nickel, yttrium, ruthenium, uranium, potassium, sodium, aluminum, mercury, palladium, platinum, gold, gallium, magnesium, barium, zinc, rubidium, cesium, lithium, indium, tantalum, strontium, cadmium, antimony, zirconium, thallium, niobium, chromium, molybdenum, tungsten, and manganese. Other metal halides capable of intercalating with graphite are listed in E. Stumpp, "The Intercalating of Metal Chlorides and Bromides Into Graphite", *Materials Science and Engineering*, 31, pp. 53-59 (1977), incorporated herein by reference.

Examples of metal oxides useful as intercalants include, but are not limited to, molybdenum trioxide, vanadium pentoxide, chromium trioxide and antimony oxide.

Examples of metal sulfides useful as intercalants include, but are not limited to, molybdenum disulfide, antimony sulfide, thallium sulfide, chromium sulfide, vanadium sulfide, tungsten sulfide, palladium sulfide, iron sulfide and copper sulfide.

In addition to providing essentially any graphite intercalation compound, the inventive method also can provide essentially any stage of a particular graphite intercalation compound. For example, a stage 1, stage 2, stage 3 or any other stage of an intercalation compound can be provided by adjusting the relative proportions of the graphite and the intercalant introduced into vessel 11. The correct proportion of graphite to intercalant needed to provide a particular stage of a particular intercalation compound is easily determined by those skilled in the art of preparing graphite intercalation compounds.

In the illustrative example presented herein, a stage 3 graphite intercalation compound including graphite and nickel chloride ($NiCl_2$) is produced by introducing nickel chloride hexahydrate ($NiCl_2 \cdot 6H_2O$) into interaction zone 20 of vessel 11 through inlet 18, the relative proportion of graphite and intercalant, i.e., nickel chloride hexahydrate, is about 45% by weight graphite to about 55% by weight nickel chloride hexahydrate. In this illustrative example, about 62.7 pounds of nickel chloride hexahydrate, commercially available from Hall Chemical Co., Wickliffe, Ohio, is introduced into the interaction zone 20 of vessel 11 after the graphite (54.3 pounds) was introduced into zone 20. This weight ratio of graphite to $NiCl_2 \cdot 6H_2O$ provides a stage three graphite-nickel chloride intercalation compound having the formula $C_{19.5}NiCl_2$, wherein the weight ratio of graphite to nickel chloride ($NiCl_2$) is about 55:45. The weight ratio of the graphite intercalation compound differs from the ratio of ingredients added to vessel 11 because the water of hydration is removed from vessel 11, as will be described in detail hereinafter.

After introducing the graphite and the intercalant into interaction zone 20 of vessel 11, the inlet 18 is closed to the atmosphere. A stream of inert gas, such as, for example, nitrogen, argon or helium, then is introduced into vessel 11 from an inert gas supply 26 along a flow path comprising a line 28, a line 30, gas inlet 12, quartz standpipe 13, tuyeres 14 and grog 16. The inert gas is introduced at a sufficient rate to fluidize the bed of graphite and intercalant in interaction zone 20 of vessel 11, i.e., cause the solid particles of graphite and intercalant to behave like a liquid.

In general, the inert gas enters and flows through vessel 11 at a rate of about 5 to about 50 feet per minute (fpm). In the illustrative example presented herein, the inert gas flows through vessel 11 at a rate of about 12 to about 15 feet per minute to fluidize the graphite and nickel chloride hexahydrate. At this rate the material comprising grog 16 is not fluidized. However, the inert gas is evenly distributed across the cross-section of the vessel 11 by tuyeres 14 and grog 16, both to fluidize the bed of graphite and intercalant in vessel 11 and to mix the unmixed graphite and intercalant to form a homogeneous fluid bed mixture.

After a sufficient time, such as about one to about five minutes, the fluid bed of graphite and intercalant is sufficiently mixed to provide the homogeneous fluid bed mixture. Then, a plurality of bed heaters 32, surrounding vessel 11 at interaction zone 20, are actuated to heat the fluid bed mixture in zone 20 to a temperature of about 250° C. to about 350° C., while a stream of inert gas continues to pass through vessel 11. At this temperature, the water of hydration associated with the intercalant, such as the water of hydration in nickel chloride hexahydrate ($NiCl \cdot 6H_2O$), is driven off from the intercalant and purged from vessel 11. Water is removed from vessel 11 prior to interacting the graphite with the nickel chloride because water can interfere with the interaction between graphite and the intercalant.

In general, intercalants, such as nickel chloride and a majority of other metal halides, sublime at an elevated temperature. It is important to avoid excessive sublimation of nickel chloride prior to and during the interaction between the graphite and the nickel chloride because the correct relative proportions of graphite and intercalant then may not be present to provide the desired stage of the graphite intercalation compound. Therefore, in a preferred embodiment, condensation of the sublimed intercalant, e.g., nickel chloride, is reduced or eliminated prior to and during the graphite-intercalant interaction. This is accomplished by introducing a heated blanket of a second inert gas through inlet 18 into free zone 24 of vessel 11. This inert gas flows from a second inert gas supply 34 along a flow path comprising a line 36, an inert gas heater 38 and a line 40. The inert gas blanket keeps the sublimed intercalant from condensing in free zone 24, by diluting the sublimed intercalant and by maintaining the intercalant at or above its sublimation temperature.

The second inert gas, e.g., nitrogen, is heated to a temperature at least equal to the interaction temperature of the graphite and the intercalant. The blanket of heated inert gas in free zone 24 of vessel 11 dilutes the intercalant, such as nickel chloride, that sublimed from the fluid bed mixture at 20. The heated inert gas blanket therefore prevents condensation of sublimed intercalant in free zone 24 of vessel 11. The temperature of the inert gas blanket is maintained at the interaction temperature or above by a plurality of free zone heaters 42 surrounding vessel 11 at free zone 24. The pressure of the heated inert gas blanket is sufficiently low such that the inert gas blanket does not adversely affect the fluid bed mixture of graphite and intercalant in interaction zone 20 of vessel 11.

Additionally, in a more preferred embodiment, a plurality of filters 44 are positioned in free zone 24 of vessel 11. Filters 44 are constructed of a porous material, such as a cast porous ceramic, and provide a surface on which graphite or the graphite intercalation compound escaping interaction zone 20 can collect. Solid material which collects on filters 44 is dislodged from the filters and returned to the fluid bed mixture in interaction zone 20 of vessel 11 by periodically pulsing, through line 48, an inert gas from a third inert gas supply 46. In the illustrative example described herein, the heated inert gas blanket further helps prevent sublimed nickel chloride from condensing on, and thereby plugging, filters 44.

An interaction between the graphite and intercalant to provide the graphite intercalation compound does not occur unless the graphite and intercalant in the vessel 11 are heated to a sufficient temperature and unless a stream of an interactive gas is introduced into and passed through vessel 11. Therefore, water and other low molecular weight compounds are purged from vessel 11 at a temperature of about 250° C. to about 350° C. and in a stream of an inert gas, but an interaction between the graphite and intercalant does not occur. After the water has been purged from vessel 11, bed heaters 32 are further actuated to increase the temperature of the fluid bed mixture in interaction zone 20 to, or slightly below, the interaction temperature for graphite and a particular intercalant. In the illustrative example described herein, using nickel chloride as the intercalant, the temperature of the fluid bed mixture is raised into a range of about 730° C. to about 750° C. in order to effect an interaction between the graphite and nickel chloride. A rapid rate of heating is preferred to eliminate excessive sublimation of the intercalant.

The temperature of the fluid bed mixture is essentially constant across the entire cross-section of vessel 11 because the inert gas stream constantly mixes the graphite and nickel chloride. As a result, each particle of graphite and each particle of nickel chloride is subjected to essentially the same temperature, and therefore a more uniform graphite intercalation compound results, in comparison to a graphite intercalation compound manufactured in a fixed bed reactor. In a fixed bed reactor, a temperature gradient exists across the reactor cross-section. As a result, interactants closer to the reactor wall are heated to a higher temperature than interactants in the center of the fixed bed reactor. The present invention essentially eliminates a temperature gradient across the cross-section of the reactor. In a preferred embodiment, vessel 11 is surrounded by insulating layers 50 to retain heat and help maintain a constant interaction temperature. The temperature of the fluid bed mixture in interaction zone 20 and the temperature of free zone 24 can be monitored by thermocouples 52.

After the fluid bed mixture in reaction zone 20 of vessel 11 has attained a temperature of about 730° C. to about 750° C., a stream of an interactive gas is introduced into and passed through vessel 11 via gas inlet 12. The interactive gas flows from an interactive gas supply 54 along a flow path defined by a line 56 and line 30, and the gas flows at a rate sufficient to maintain the fluid bed mixture in a fluidized state. After initiating the flow of the interactive gas stream through vessel 11, the flow of inert gas through vessel 11 may be stopped. This procedure helps ensure that the graphite and nickel chloride remain fluidized throughout the process.

In embodiments wherein the graphite intercalation compound comprises graphite and a metal halide intercalant, like nickel chloride, the interactive gas is a halogen gas, such as chlorine, bromine, iodine or fluorine. In embodiments wherein the intercalant is a metal oxide or a metal sulfide. The interactive gas is oxygen. In the illustrative embodiment presented herein, the intercalant is a metal halide and the interactive gas is chlorine. Chlorine is the preferred interactive gas for a metal halide intercalant because of abundance of supply and economics. The interactive gas includes at least 5%, and up to 100%, by weight of a gas capable of interacting with the intercalant.

After the interaction zone 20 is heated to the interaction temperature, and as the stream of interactive gas flows through vessel 11, an interaction between the graphite and nickel chloride occurs. The interaction may be accompanied by an exotherm raising the temperature of the fluid bed mixture of graphite and nickel chloride to or above about 750° C., the interaction temperature for graphite and nickel chloride. If an exotherm is not observed, the fluid bed mixture in interaction zone 20 of vessel 11 can be heated to about 750° C. by bed heaters 32 to ensure that the interaction temperature is attained.

At about 750° C., and in the presence of an interactive gas, e.g., chlorine gas, the graphite and nickel chloride interact to form a graphite-nickel chloride intercalation compound. The graphite and nickel chloride do not interact in the absence of an interactive gas, even at the interaction temperature, because the interactive gas is required to mediate the electron transfers that form the graphite intercalation compound. It is theorized, but is not relied upon herein, that solid nickel chloride and chlorine gas interact to form an intermediate nickel complex ($NiCl_3$) that condenses on the surface of a graphite particle, whereupon the intermediate nickel complex forces apart adjacent layers of carbon in the graphite and migrates between those layers. The intermediate nickel complex then is reduced in the interior of the graphite. The overall result is layers of carbon having $NiCl_2$ intercalated therein and a graphite surface having a layer of the intermediate nickel complex ($NiCl_3$).

The interaction between the graphite and the nickel chloride is allowed to proceed at about 750° C. in the presence of the chlorine gas for about one hour, i.e., a time sufficient to form a stage 3 graphite-nickel chloride intercalation compound having the formula $C_{19.5}NiCl_2$. Depending upon the particular intercalant utilized, the graphite and intercalant interact at a temperature of about 600° C. to about 1000° C., and the interactants are maintained at the interaction temperature for a sufficient time to interact and form the graphite intercalation compound, i.e., from about 5 minutes to about 60 minutes.

In the present method, after forming the graphite intercalation compound, the excess intercalant is sublimed from the graphite intercalation compound. Excess intercalant includes both nickel chloride that has not interacted with the graphite and the intermediate nickel complex present on the graphite surface. The excess nickel chloride is removed from the graphite intercalation compound to provide a more pure and uniform graphite intercalation compound, compared to a graphite intercalation compound manufactured in a static bed reactor.

In the illustrative example presented herein, the excess nickel chloride is sublimed from the graphite-nickel chloride intercalation compound by increasing the temperature of the graphite intercalation compound in vessel 11 to above the sublimation temperature for nickel chloride, i.e., about 790° F., and maintaining this increased temperature for about 10 minutes, while continuing to pass a stream of interactant gas through vessel 11. The excess intercalant also can be sublimed from the graphite intercalation compound in the presence of an inert gas stream. However, it is preferred that the excess intercalant is sublimed from the graphite intercalation compound in the presence of an interactive gas stream, because the interactive gas stream forces the equilibrium of the intercalation interaction towards formation of the graphite intercalation compound.

If an inert gas blanket was used to dilute the nickel chloride vapors in free zone 24 of vessel 11, the flow of gas from second inert gas supply 34 is maintained when the excess nickel chloride is sublimed from the graphite intercalation compound to preclude condensation of the nickel chloride on filter 44. This allows any excess or free nickel chloride to be purged from vessel 11, through a gas outlet 58, as a sublimed vapor in the stream of interactive gas. The purged nickel chloride vapors are condensed in a nickel chloride condenser 60, and the interactive, or inert, gas is directed to a scrubber (not shown) by a line 62.

After subliming the excess intercalant from vessel 11, the stream of interactant gas passing through vessel 11 is replaced by a stream of inert gas, while maintaining the inert gas blanket. Then, bed heaters 32 and free zone heaters 42 are turned off, and vessel 11 is cooled while the inert gas stream, e.g., a nitrogen stream, is passed through vessel 11. After sufficient cooling, e.g., when the graphite intercalation compound is cooled to a temperature of about 25° C. to about 40° C., the flow of inert gas from inert gas supply 26 is turned off.

The fluidized bed of graphite intercalation compound is allowed to settle, then the graphite intercalation compound is removed from vessel 11, for example by evacuating vessel 11 and withdrawing the graphite intercalation compound from vessel 11 under vacuum through inlet 18. Alternatively, the graphite intercalation compound is removed through a valve positioned at the bottom of vessel 11 (not shown). The graphite intercalation compound can then be used, e.g., as a solid lubricant by incorporating the graphite intercalation compound into a polymer-based bearing. The graphite intercalation compound has the ability to provide self-lubrication as the bearing wears down.

The above-described method provided about 80 pounds of the stage 3 graphite-nickel chloride intercalation compound in about 8 hours, whereas the conventional method using a fixed bed reactor provides only about 3.5 pounds of graphite intercalation compound in about 8 hours. The present method also provides an excellent yield of about 0.7 pounds of graphite intercalation compound per pound of feed interactants. In addition, a graphite intercalation compound provided by the method of the present invention is essentially free of excess intercalant, thereby providing an essentially pure graphite intercalation compound.

Figure 2:
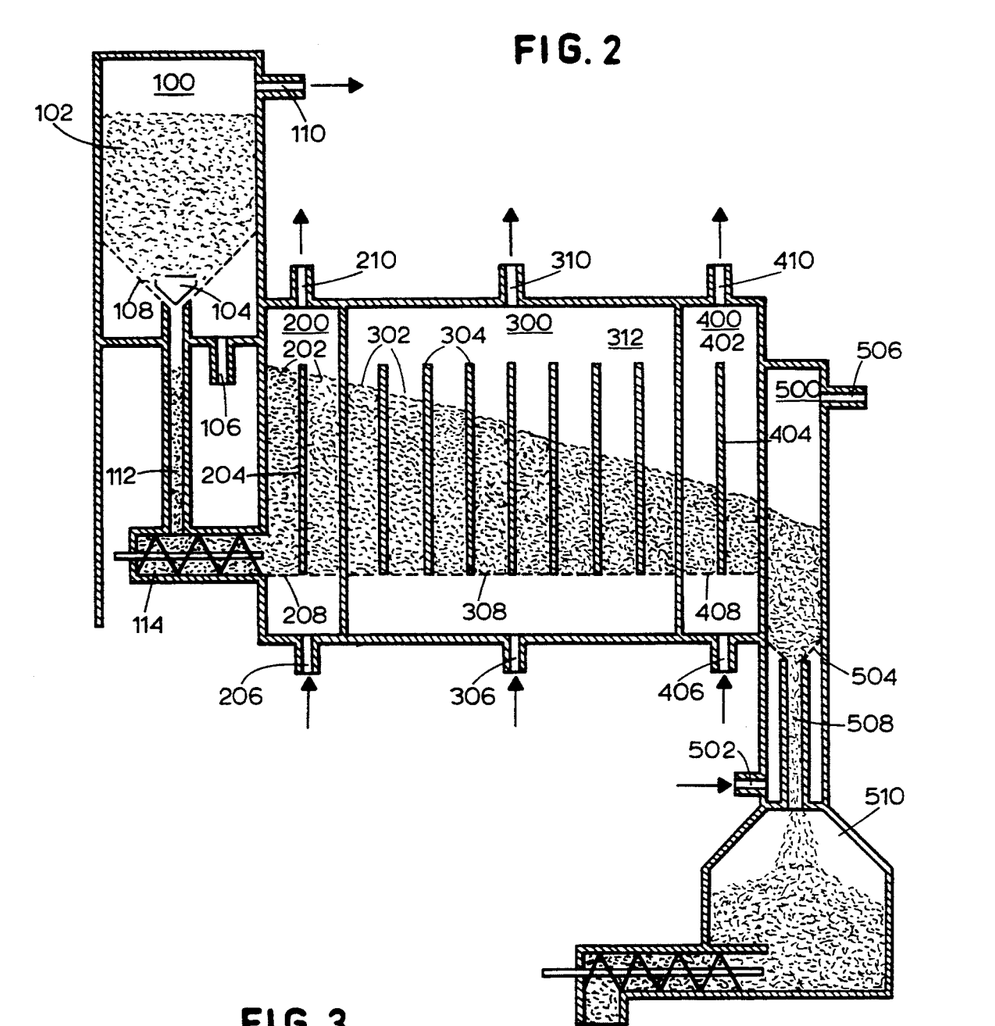
FIG. 2 is a full sectional view of a continuous fluidized bed reactor useful in the method of the present invention.
Figure 3:
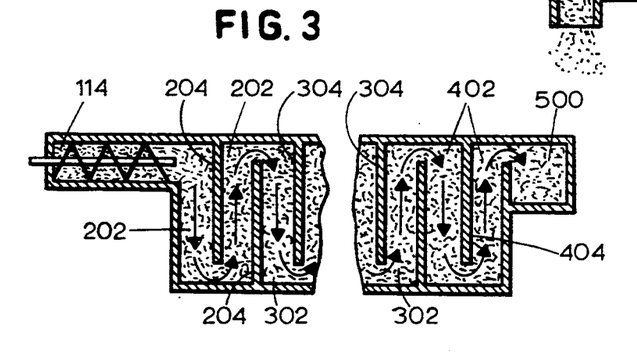
FIG. 3 is a partial top view of the continuous fluidized bed reactor.

The alternate method of continuously producing a graphite intercalation compound is illustrated by reference to FIGS. 2 and 3. In particular, FIG. 2 shows a fluidized bed apparatus useful in the continuous manufacture of a graphite intercalation compound. The apparatus includes a mixing zone 100 defined by a vessel 102. The graphite and intercalant are introduced into vessel 102 while valve 104 is in the closed position. After a predetermined amount of graphite and intercalant are introduced into vessel 102, an unheated stream of an inert gas is introduced through the first inert gas inlet 106 and the first gas distribution system 108 at a sufficient rate to fluidize the bed of graphite and intercalant. The first gas distribution system 108 is designed such that the stream of inert gas is evenly distributed across the cross-section of vessel 102. The stream of inert gas exits vessel 102 through a first inert gas outlet 110.

After a sufficient time, the fluidized bed of graphite and intercalant are sufficiently mixed to form a homogeneous fluid bed mixture. Valve 104 then is opened, and the homogenous fluid bed mixture enters conduit 112, where, in the absence of an inert gas stream, the homogeneous fluid bed mixture leaves the fluidized state and forms an unfluidized homogeneous mixture of graphite and intercalant particles. The unfluidized homogeneous mixture enters a feeder 114, such as a screw conveyor, and is transferred to a first buffer zone 200.

The first buffer zone 200 includes a plurality of chambers 202 separated by dividers 204. As illustrated in FIG. 3, dividers 204 are positioned such that a homogeneous fluid bed mixture of graphite and intercalant can travel horizontally in a back and forth path through chambers 202. First buffer zone 200 serves to refluidize the homogeneous mixture of graphite and intercalant, to heat the homogeneous fluid bed mixture of graphite and intercalant to the interaction temperature, and to drive moisture from the intercalant.

In particular, the homogeneous mixture of graphite and intercalant is introduced into first buffer zone 200 by feeder 114. A heated stream of an inert gas is introduced into first buffer zone 200 through second inert gas inlet 206 and second gas distribution system 208 to fluidize the homogeneous mixture of graphite and intercalant and to maintain the mixture in a fluid state throughout first buffer zone 200. The stream of inert gas exits first buffer zone 200 through second inert gas outlet 210.

The stream of inert gas entering first buffer zone 200 is heated to a sufficient temperature to drive water of hydration from the intercalant and to heat the homogeneous fluid bed mixture of graphite and intercalant to the interaction temperature. Optionally, bed heaters can be mounted on dividers 204 to attain the interaction temperature. The number of chambers 202 and dividers 204 can be selected to provide a sufficiently long residence time to sufficiently heat the homogeneous fluid bed mixture and to dehydrate the intercalant in first buffer zone 200.

The heated and dehydrated homogeneous fluid bed mixture exits first buffer zone 200 and enters an interaction zone 300. Interaction zone 300 also includes a plurality of chambers 302 divided by dividers 304. As illustrated in FIG. 3, dividers 304 are positioned to allow the homogeneous fluid bed mixture to travel horizontally through chambers 302 in a back and forth flow path.

In particular, the stream of interactive gas entering interaction zone 300 via interactive gas inlet 306 is heated to maintain the homogeneous fluid bed mixture at a temperature sufficient for the graphite and intercalant to interact and form the graphite intercalation compound. Bed heaters also can be mounted on dividers 304 to help maintain the homogeneous fluid bed mixture at the interaction temperature. The plurality of chambers 302 provides a sufficient residence time for formation of the graphite intercalation compound.

In another embodiment, a series of chambers 302, located in a purification zone 312, can be maintained at a temperature sufficiently above the interaction temperature to drive off excess intercalant, thereby providing a graphite intercalation compound that is essentially free of excess intercalant.

The fluidized bed of graphite intercalation compound exits interaction zone 300 and enters a second buffer zone 400 wherein the graphite intercalation compound is cooled. Second buffer zone 400 also prevents the interactive gas from exiting the apparatus by flushing the interactive gas from the graphite intercalation compound with a stream of inert gas. Second buffer zone 400 includes chambers 402 and dividers 404, designed and positioned as described above, to allow the fluidized bed of intercalation compound to travel horizontally through chambers 402 in a back and forth flow path. A stream of unheated inert gas is introduced into chambers 402 through a third inert gas inlet 406 and a fourth gas distribution system 408. The stream of inert gas exits second buffer zone 400 through a fourth gas outlet 410.

The cooled graphite intercalation compound exits second buffer zone 400 and enters a collection zone 500. In collection zone 500, a stream of unheated inert gas is introduced through a fourth inert gas outlet 502 and a fifth gas distribution system 504 to maintain the graphite intercalation in a fluidized state. The inert gas exits collection zone 500 through a fifth gas outlet 506.

The graphite intercalation compound remains in a fluidized state until the compound enters a duct 508 positioned downstream from fifth gas distribution system 504. The graphite intercalation compound then falls into a collection bin 510 and is packaged by conventional procedures known to those skilled in the art.

It should be understood that the abovedescribed continuous process is merely an illustrative embodiment, and that other continuous processes, such as a process utilizing a vertically disposed apparatus, are envisioned.

In accordance with another important feature of the present invention, essentially any graphite intercalation compound, prepared by essentially any method, including the conventional fixed bed method, can be purified to include 1% or less by weight excess intercalant. To purify a graphite intercalation compound, the graphite intercalation compound first is introduced into a vessel. Then the graphite intercalation compound is heated, in the presence of a gas stream passing through the graphite intercalation compound, to a sufficient temperature to sublime the excess intercalant from the graphite intercalation compound. The gas stream can comprise an inert gas, an interactive gas or a combination thereof. A stream of interactive gas is preferred because an interactive gas favors the formation of the graphite intercalant compound. The purification of a graphite intercalation compound can be performed in either a fixed bed reactor or a fluidized bed reactor. It has been found that although fluidization promotes formation of the graphite intercalation compound, fluidization is not essential in purifying a graphite intercalation compound.

The present method utilizing a fluidized bed reactor provides a more uniform graphite intercalation compound because the interactants in the fluidized bed reactor are uniformly heated, and because the interactants uniformly contact the interactant gas stream passing through the reactor. The present method also overcomes the disadvantages of the conventional method utilizing a fixed bed reactor, e.g., by eliminating: 1) a temperature gradient across the cross-section of the reactor, 2) packing of the graphite and intercalant mixture in the reactor bed, 3) channeling of the interactant gas through the fixed bed of graphite and intercalant, 4) the need to premix the graphite and intercalant, and 5) long interaction times due to poor interactive gas contact with the graphite and intercalant.

The above limitations of fixed bed reactors prohibit the assembly of relatively large fixed bed reactors that can produce large volumes of a graphite intercalation compound. Accordingly, to minimize channeling, packing of ingredients, and temperature gradients, the size of fixed bed reactors are limited in size to produce only about 3.5 pounds of graphite intercalation compounds in about 8 hours. The present method overcomes the design limitations inherent in a fixed bed reactor, and accordingly large fluidized bed reactors can be assembled to economically produce significantly greater volumes of the graphite intercalation compound, e.g., about 80 pounds per 8 hours in a batch process or about 210 pounds per 8 hours in a continuous process.

The present method also provides a graphite intercalation compound that exhibits improved properties. For example, in a conventional method of purifying a graphite intercalation compound, excess intercalant is removed from the graphite intercalation compound by forming a slurry of the graphite intercalation compound in an organic solvent, like methyl ethyl ketone. The organic solvent extracts the excess intercalant from the graphite intercalation compound. The organic solvent and excess intercalant are separated from the graphite intercalation compound, such as by filtration, then the graphite intercalation compound is dried.

However, drying the graphite intercalation compound often does not remove all of the organic solvent from the graphite intercalation compound. The organic solvent remaining in the graphite intercalation compound can cause severe problems during subsequent processing. For example, in high temperature compression molding of a graphite intercalation compound, the remaining organic solvent is vaporized and can form voids in the article of manufacture of up to about one-quarter inch in diameter. The article of manufacture therefore is weakened, and the formation of organic solvent vapors during the compression process can create a danger of explosion. A graphite intercalation compound prepared in accordance with the present method is essentially free of excess intercalant thereby precluding the organic solvent purifying step.

In addition, a graphite intercalation compound including essentially no excess intercalant prepared by the method of the present invention demonstrates an improved thermal stability. In a thermogravimetric analysis, a graphite intercalation compound prepared in a conventional fixed bed method demonstrated a weight loss starting at about 500° C. It has been theorized that the weight loss is due to excess intercalant present in the graphite intercalation compound. In an identical thermogravimetric analysis, a graphite intercalation compound prepared by the present method did not exhibit a weight loss until subjected to a temperature of about 650° C.

Obviously many modifications and variations of the invention as hereinbefore set forth can be made without departing from the spirit and scope thereof and therefore only such limitations should be imposed as are indicated by the appended claims.

We claim:

1. A method of preparing an intercalation compound comprising a host material selected from the group consisting of graphite, molybdenum disulfide and hexagonal boron nitride, and an intercalant selected from the group consisting of molybdenum trioxide, vanadium pentoxide, chromium trioxide, antimony oxide, molybdenum disulfide, antimony sulfide, thallium sulfide, chromium sulfide, vanadium sulfide, tungsten sulfide, palladium sulfide, iron sulfide, and copper sulfide, said method comprising the steps of:
- (a) introducing said host material and said intercalant into a fluidized bed reactor;
- (b) passing a stream of an inert gas through said fluidized bed reactor to mix said host material and said intercalant and form a fluid bed mixture;
- (c) heating said fluid bed mixture in the presence of said inert gas stream to provide a heated fluid bed mixture having a temperature sufficient for said host material and said intercalant to interact in the presence of oxygen; and
- (d) passing a stream of oxygen through said heated fluid bed mixture for a time sufficient for the oxygen to cause the host material and the intercalant to interact and form an intercalation compound.

2. The method of claim 1 wherein said host material is graphite.

3. The method of claim 1 further comprising the step of:
   heating the fluid bed mixture formed in a step (b) to a sufficient temperature and for a sufficient time, in the presence of said inert gas stream, to remove moisture from the fluidized bed reactor prior to heating the fluid bed mixture to the interaction temperature in step (c).

4. The method of claim 1 wherein:
   said inert gas is selected from the group consisting of nitrogen, argon, and helium.

5. The method of claim 1 wherein:
   said fluid bed mixture is heated in step (c) to a temperature of about 600° C. to about 1000° C.

6. The method of claim 1 wherein:
   said stream of oxygen includes at least 5% by weight oxygen.

7. The method of claim 3 wherein:
   said fluid bed mixture is heated to a temperature of about 250° C. to about 350° C.

8. The method of claim 1 wherein the host material is graphite and the intercalant is molybdenum disulfide.

9. A method of preparing a graphite-nickel chloride intercalation compound having the formula $C_{19.5}NiCl_2$, said method comprising the steps of:
- (a) introducing graphite and nickel chloride hexahydrate into a fluidized bed reactor in an amount of about 45% by weight graphite and about 55% by weight nickel chloride hexahydrate;
- (b) passing a stream of an inert gas through said fluidized bed reactor to mix said graphite and said nickel chloride hexahydrate and form a fluid bed mixture;
- (c) heating said fluid bed mixture in the presence of said inert gas stream to a temperature of about 730° C. to about 750° C.; and
- (d) passing a stream of chlorine gas through said heated fluid bed mixture for a time sufficient to form a graphite-nickel chloride intercalation compound.

10. A method of preparing an intercalation compound comprising a host material selected from the group consisting of graphite, molybdenum disulfide and hexagonal boron nitride, and an intercalant selected from the group consisting of molybdenum trioxide, vanadium pentoxide, chromium trioxide, antimony oxide, molybdenum disulfide, antimony sulfide, thallium sulfide, chromium sulfide, vanadium sulfide, tungsten sulfide, palladium sulfide, iron sulfide, and copper sulfide, said method comprising the steps of:
- (a) introducing said host material and said intercalant into a fluidized bed reactor;
- (b) passing a stream of an inert gas through said fluidized bed reactor to mix said host material and said intercalant and form a fluid bed mixture;
- (c) heating said fluid bed mixture in the presence of said inert gas stream to provide a heated fluid bed mixture having a temperature sufficient for said host material and said intercalant to interact in the presence of oxygen;
- (d) passing a stream of oxygen through said heated fluid bed mixture for a time sufficient for said oxygen to cause said host material and said intercalant to interact and form an intercalation compound; and
- (e) heating said intercalation compound formed in step (d) to a sufficient temperature, and passing a gas stream through the intercalation compound for a sufficient time, to separate nonintercalated intercalant from said intercalation compound and provide an intercalation compound that is essentially free of nonintercalated intercalant.

11. The method of claim 10 and further comprising the step of:
- (f) cooling said intercalation compound formed in step (e) by passing a stream of an inert gas through said fluidized bed reactor, in the absence of said stream of oxygen.

12. The method of claim 10 wherein:
   said intercalation compound is heated to at least the sublimation temperature of said intercalant.

* * * * *

UNITED STATES PATENT AND TRADEMARK OFFICE
CERTIFICATE OF CORRECTION

PATENT NO. : 5,352,430
DATED : October 4, 1994
INVENTOR(S) : McCulfor et al.

It is certified that error appears in the above-indentified patent and that said Letters Patent is hereby corrected as shown below:

Column 9, line 65, "sulfide.  The" should be --sulfide, the--.

Column 10, line 27, "(NiCl$_3$)" should be --(NiCl$_3^-$)--.

Column 10, line 35, "(NiCl$_3$)" should be --(NiCl$_3^-$)--.

Column 13, line 28, "abovedescribed" should be --above-described--.

Signed and Sealed this

Twentieth Day of December, 1994

Attest:

BRUCE LEHMAN

*Attesting Officer*   *Commissioner of Patents and Trademarks*